US008126750B2

(12) United States Patent
Tien et al.

(10) Patent No.: US 8,126,750 B2
(45) Date of Patent: Feb. 28, 2012

(54) CONSOLIDATING DATA SOURCE QUERIES FOR MULTIDIMENSIONAL SCORECARDS (75) Inventors: Ian Tien, Seattle, WA (US); Corey Hulen, Sammamish, WA (US); Chen-I Lim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1172 days.

(21) Appl. No.: 11/412,458

(22) Filed: Apr. 27, 2006

(65) Prior Publication Data
US 2007/0254740 A1 Nov. 1, 2007

(51) Int. Cl.
G06F 17/60 (2006.01)
(52) U.S. Cl. .............................................. 705/7; 705/11
(58) Field of Classification Search .................. 705/7, 11
See application file for complete search history.

(56) References Cited

U.S. PATENT DOCUMENTS

| | | | |
|---|---|---|---|
| 5,233,552 A | 8/1993 | Brittan | 708/445 |
| 5,404,295 A | 4/1995 | Katz et al. | 715/231 |
| 5,615,347 A | 3/1997 | Davis et al. | 715/833 |
| 5,675,782 A * | 10/1997 | Montague et al. | 726/4 |
| 5,764,890 A * | 6/1998 | Glasser et al. | 726/11 |
| 5,779,566 A | 7/1998 | Wilens | 473/407 |
| 5,819,225 A * | 10/1998 | Eastwood et al. | 704/275 |
| 5,838,313 A | 11/1998 | Hou et al. | 715/201 |
| 5,877,758 A | 3/1999 | Seybold | 715/866 |
| 5,911,143 A * | 6/1999 | Deinhart et al. | 1/1 |
| 5,941,947 A * | 8/1999 | Brown et al. | 709/225 |
| 5,943,666 A * | 8/1999 | Kleewein et al. | 1/1 |
| 6,061,692 A * | 5/2000 | Thomas et al. | 707/613 |
| 6,115,705 A * | 9/2000 | Larson | 1/1 |
| 6,226,635 B1 * | 5/2001 | Katariya | 1/1 |
| 6,341,277 B1 * | 1/2002 | Coden et al. | 1/1 |
| 6,463,431 B1 | 10/2002 | Schmitt | 1/1 |
| 6,466,935 B1 | 10/2002 | Stuart | 1/1 |
| 6,522,342 B1 | 2/2003 | Gagnon et al. | 715/716 |
| 6,563,514 B1 | 5/2003 | Samar | 715/711 |
| 6,601,233 B1 | 7/2003 | Underwood | 717/102 |
| 6,604,084 B1 | 8/2003 | Powers et al. | 705/11 |
| 6,606,627 B1 * | 8/2003 | Guthrie et al. | 1/1 |
| 6,633,889 B2 * | 10/2003 | Dessloch et al. | 1/1 |
| 6,665,577 B2 | 12/2003 | Onyshkevych et al. | 700/130 |
| 6,687,735 B1 | 2/2004 | Logston et al. | 709/203 |

(Continued)

FOREIGN PATENT DOCUMENTS

WO   WO 2005/072410 A2   8/2005

OTHER PUBLICATIONS

Bloomfield, Charles, Bringing the Balanced Scorecard to Life: The Microsoft Balanced Scorecard Framework InsightInformation, Inc., May 2002.*

(Continued)

Primary Examiner — Scott L Jarrett
(74) Attorney, Agent, or Firm — Merchant & Gould (57) ABSTRACT Data retrieval from data sources associated with elements of a scorecard is optimized by combining the queries for the same data sources into a single query. The querying process is further optimized based on an attribute and/or condition of a data source. Query parameters and execution schedule may be adjusted based on the elements, data sources, or subscriber identity. Retrieved data is cached at element, combination of elements, data source, or scorecard level for rapid and efficient building and maintenance of scorecards.

15 Claims, 6 Drawing Sheets

U.S. PATENT DOCUMENTS

| | | | |
|---|---|---|---|
| 6,728,724 B1* | 4/2004 | Megiddo et al. ................ 1/1 |
| 6,763,134 B2 | 7/2004 | Cooper et al. .............. 382/162 |
| 6,782,421 B1 | 8/2004 | Soles et al. ................ 709/223 |
| 6,785,675 B1* | 8/2004 | Graves et al. ................... 1/1 |
| 6,804,657 B1 | 10/2004 | Sultan .................... 705/7.31 |
| 6,854,091 B1 | 2/2005 | Beaudoin ................. 715/854 |
| 6,867,764 B2 | 3/2005 | Ludtke .................... 345/173 |
| 6,868,087 B1 | 3/2005 | Agarwala et al. .......... 370/412 |
| 6,900,808 B2* | 5/2005 | Lassiter et al. ............ 345/440 |
| 6,901,426 B1* | 5/2005 | Powers et al. ............. 709/203 |
| 6,917,921 B1 | 7/2005 | Cimral et al. ................. 705/7 |
| 6,976,086 B2* | 12/2005 | Sadeghi et al. ............ 709/236 |
| 7,043,524 B2 | 5/2006 | Shah et al. ................ 709/203 |
| 7,065,784 B2* | 6/2006 | Hopmann et al. .............. 726/4 |
| 7,079,010 B2 | 7/2006 | Champlin ............. 340/286.02 |
| 7,158,628 B2 | 1/2007 | McConnell et al. ..... 379/265.02 |
| 7,200,595 B2* | 4/2007 | Dutta et al. ..................... 1/1 |
| 7,216,116 B1 | 5/2007 | Nilsson et al. ................... 1/1 |
| 7,222,308 B2 | 5/2007 | Sauermann et al. ......... 715/833 |
| 7,249,120 B2* | 7/2007 | Bruno et al. ..................... 1/1 |
| 7,275,024 B2 | 9/2007 | Yeh et al. ..................... 703/2 |
| 7,302,421 B2 | 11/2007 | Aldridge ......................... 1/1 |
| 7,302,431 B1 | 11/2007 | Apollonsky et al. ............... 1/1 |
| 7,302,444 B1 | 11/2007 | Dunmore et al. ................. 1/1 |
| 7,313,561 B2 | 12/2007 | Lo et al. ........................ 1/1 |
| 7,340,448 B2* | 3/2008 | Santosuosso ................... 1/1 |
| 7,349,877 B2 | 3/2008 | Ballow et al. ............. 705/36 R |
| 7,359,865 B1 | 4/2008 | Connor et al. ............. 705/10 |
| 7,383,247 B2* | 6/2008 | Li et al. ......................... 1/1 |
| 7,398,240 B2 | 7/2008 | Ballow et al. ............. 705/35 |
| 7,406,431 B2 | 7/2008 | Spira et al. .................. 705/7 |
| 7,409,357 B2 | 8/2008 | Schaf et al. .................. 705/7 |
| 7,433,876 B2* | 10/2008 | Spivack et al. .................. 1/1 |
| 7,454,393 B2* | 11/2008 | Horvitz et al. .............. 706/46 |
| 7,496,857 B2 | 2/2009 | Stata et al. ................ 715/833 |
| 7,546,226 B1 | 6/2009 | Yeh et al. ..................... 703/2 |
| 7,546,246 B1 | 6/2009 | Stamm et al. ................. 705/7 |
| 7,548,912 B2* | 6/2009 | Gideoni et al. ................... 1/1 |
| 7,559,023 B2 | 7/2009 | Hays et al. ................. 715/255 |
| 7,568,217 B1* | 7/2009 | Prasad et al. .................. 726/3 |
| 7,587,755 B2 | 9/2009 | Kramer ........................ 726/4 |
| 7,617,177 B2 | 11/2009 | Bukary et al. .................... 1/1 |
| 7,617,187 B2* | 11/2009 | Zhu et al. ...................... 1/1 |
| 7,630,965 B1 | 12/2009 | Erickson et al. ................. 1/1 |
| 7,634,478 B2 | 12/2009 | Yang et al. ...................... 1/1 |
| 7,640,506 B2 | 12/2009 | Pratley et al. .............. 715/751 |
| 7,660,731 B2 | 2/2010 | Chaddha et al. ............... 705/8 |
| 7,667,582 B1 | 2/2010 | Waldorf .................... 340/440 |
| 7,685,207 B1 | 3/2010 | Helms ....................... 707/790 |
| 7,694,270 B2 | 4/2010 | Manikotia et al. ........... 717/101 |
| 7,698,349 B2 | 4/2010 | Hulen et al. ............... 707/805 |
| 7,702,554 B2 | 4/2010 | Ballow et al. ............. 705/35 |
| 7,702,779 B1 | 4/2010 | Gupta et al. ............... 709/224 |
| 7,707,490 B2 | 4/2010 | Hays et al. ................. 715/234 |
| 7,716,253 B2 | 5/2010 | Netz et al. ................. 707/803 |
| 7,716,278 B2 | 5/2010 | Beringer et al. ............ 709/203 |
| 7,716,571 B2* | 5/2010 | Tien et al. .................. 715/212 |
| 7,716,592 B2 | 5/2010 | Tien et al. .................. 715/744 |
| 7,725,947 B2 | 5/2010 | Bukary et al. ................ 726/30 |
| 7,730,023 B2 | 6/2010 | MacGregor ............... 707/603 |
| 7,730,123 B1 | 6/2010 | Erickson et al. ............ 709/203 |
| 7,739,148 B2 | 6/2010 | Suzuki et al. ............... 705/26 |
| 7,747,572 B2 | 6/2010 | Scott et al. ................ 707/636 |
| 7,752,094 B2 | 7/2010 | Davidson et al. ............ 705/31 |
| 7,752,301 B1* | 7/2010 | Maiocco et al. ............ 709/224 |
| 7,778,910 B2 | 8/2010 | Ballow et al. ............. 705/36 R |
| 7,788,280 B2 | 8/2010 | Singh et al. ................ 707/791 |
| 7,792,774 B2 | 9/2010 | Friedlander et al. .......... 706/47 |
| 7,822,662 B2 | 10/2010 | Guzik et al. ................ 705/35 |
| 7,831,464 B1 | 11/2010 | Nichols et al. ............. 705/7.39 |
| 7,840,896 B2* | 11/2010 | Tien et al. .................. 715/243 |
| 2001/0051835 A1 | 12/2001 | Cline ......................... 700/91 |
| 2002/0029273 A1* | 3/2002 | Haroldson et al. ........... 709/226 |
| 2002/0052862 A1 | 5/2002 | Scott et al. ................. 707/1 |
| 2002/0099678 A1 | 7/2002 | Albright et al. .............. 706/45 |
| 2002/0103976 A1 | 8/2002 | Steely et al. ............... 711/135 |
| 2002/0112171 A1 | 8/2002 | Ginter et al. ............... 713/185 |
| 2002/0147803 A1 | 10/2002 | Dodd et al. ................ 709/223 |
| 2002/0161614 A1 | 10/2002 | Spira et al. .................. 705/7 |
| 2002/0177784 A1 | 11/2002 | Shekhar ..................... 600/519 |
| 2002/0178119 A1* | 11/2002 | Griffin et al. ................ 705/54 |
| 2002/0184043 A1 | 12/2002 | Lavorgna et al. .............. 705/1 |
| 2002/0184061 A1 | 12/2002 | Digate et al. ................. 705/7 |
| 2002/0188513 A1 | 12/2002 | Gil et al. ..................... 705/22 |
| 2002/0198985 A1 | 12/2002 | Fraenkel et al. ............ 709/224 |
| 2003/0014290 A1 | 1/2003 | McLean et al. .............. 705/7 |
| 2003/0014488 A1 | 1/2003 | Dalal et al. ................. 709/204 |
| 2003/0033191 A1 | 2/2003 | Davies et al. ............... 705/10 |
| 2003/0055731 A1 | 3/2003 | Fouraker et al. ............ 705/22 |
| 2003/0055927 A1 | 3/2003 | Fischer et al. .............. 709/221 |
| 2003/0061132 A1 | 3/2003 | Yu et al. ..................... 705/30 |
| 2003/0065604 A1 | 4/2003 | Gatto ........................ 705/36 |
| 2003/0065605 A1 | 4/2003 | Gatto ........................ 705/36 |
| 2003/0069773 A1* | 4/2003 | Hladik et al. ................. 705/7 |
| 2003/0069824 A1 | 4/2003 | Menninger ................. 705/37 |
| 2003/0071814 A1 | 4/2003 | Jou et al. .................... 345/440 |
| 2003/0078830 A1 | 4/2003 | Wagner et al. |
| 2003/0195878 A1* | 10/2003 | Neumann .................... 707/3 |
| 2003/0236732 A1 | 12/2003 | Cimral et al. ............... 705/36 |
| 2004/0021695 A1 | 2/2004 | Sauermann et al. ......... 345/789 |
| 2004/0044665 A1 | 3/2004 | Nwabueze .................... 707/9 |
| 2004/0044678 A1 | 3/2004 | Kalia et al. ................ 707/102 |
| 2004/0064293 A1 | 4/2004 | Hamilton et al. ............ 702/182 |
| 2004/0066782 A1 | 4/2004 | Nassar ...................... 370/389 |
| 2004/0068431 A1 | 4/2004 | Smith et al. ................. 705/10 |
| 2004/0119752 A1 | 6/2004 | Berringer et al. ............ 345/779 |
| 2004/0135826 A1 | 7/2004 | Pickering .................. 345/860 |
| 2004/0199541 A1 | 10/2004 | Goldberg et al. .......... 707/104.1 |
| 2004/0212636 A1 | 10/2004 | Stata et al. ................ 345/703 |
| 2004/0215626 A1* | 10/2004 | Colossi et al. ............. 707/100 |
| 2004/0225955 A1* | 11/2004 | Ly ............................ 715/500 |
| 2004/0249657 A1 | 12/2004 | Koi et al. ..................... 705/1 |
| 2004/0254806 A1 | 12/2004 | Schwerin-Wenzel et al. .... 705/1 |
| 2004/0254860 A1 | 12/2004 | Wagner et al. ............. 705/27 |
| 2004/0260717 A1 | 12/2004 | Albornoz et al. ........... 707/102 |
| 2005/0004781 A1 | 1/2005 | Price et al. ................. 702/188 |
| 2005/0049831 A1 | 3/2005 | Lilly ......................... 702/182 |
| 2005/0065925 A1* | 3/2005 | Weissman et al. ............ 707/4 |
| 2005/0071680 A1 | 3/2005 | Bukary et al. .............. 713/201 |
| 2005/0071737 A1* | 3/2005 | Adendorff et al. ........... 715/500 |
| 2005/0097517 A1 | 5/2005 | Goin et al. ................. 717/124 |
| 2005/0144022 A1 | 6/2005 | Evans ......................... 705/1 |
| 2005/0154635 A1 | 7/2005 | Wright et al. ............... 705/11 |
| 2005/0154769 A1 | 7/2005 | Eckart et al. .............. 707/201 |
| 2005/0181835 A1 | 8/2005 | Lau et al. ................... 455/567 |
| 2005/0197946 A1 | 9/2005 | Williams et al. ............. 705/36 |
| 2005/0203876 A1 | 9/2005 | Cragun et al. ................ 707/3 |
| 2005/0209943 A1 | 9/2005 | Ballow et al. ............. 705/35 |
| 2005/0209945 A1 | 9/2005 | Ballow et al. ............. 705/35 |
| 2005/0209946 A1 | 9/2005 | Ballow et al. ............. 705/35 |
| 2005/0209948 A1 | 9/2005 | Ballow et al. ............. 705/36 |
| 2005/0210052 A1 | 9/2005 | Aldridge .................. 707/101 |
| 2005/0228880 A1 | 10/2005 | Champlin .................. 709/224 |
| 2005/0240898 A1 | 10/2005 | Manikotia et al. ........... 717/101 |
| 2005/0262051 A1 | 11/2005 | Dettinger et al. .............. 707/3 |
| 2005/0262451 A1 | 11/2005 | Remignanti et al. ......... 715/833 |
| 2006/0010164 A1 | 1/2006 | Netz et al. ................ 707/104.1 |
| 2006/0020531 A1 | 1/2006 | Veeneman et al. ........... 705/35 |
| 2006/0026179 A1 | 2/2006 | Brown et al. .............. 707/100 |
| 2006/0036595 A1 | 2/2006 | Gilfix et al. ................... 707/5 |
| 2006/0047419 A1 | 3/2006 | Diendorf et al. ............ 701/208 |
| 2006/0074789 A1 | 4/2006 | Capotosto et al. ........... 705/35 |
| 2006/0080156 A1 | 4/2006 | Baughn et al. ................ 705/7 |
| 2006/0085444 A1* | 4/2006 | Sarawgi et al. ............. 707/100 |
| 2006/0089868 A1 | 4/2006 | Griller et al. ................ 705/10 |
| 2006/0095276 A1 | 5/2006 | Axelrod et al. ............... 705/1 |
| 2006/0111921 A1 | 5/2006 | Chang et al. ................. 705/1 |
| 2006/0136830 A1 | 6/2006 | Martlage et al. ............ 715/745 |
| 2006/0154692 A1 | 7/2006 | Ikehara et al. ............ 455/556.2 |
| 2006/0161471 A1 | 7/2006 | Hulen et al. ................ 705/10 |
| 2006/0161596 A1 | 7/2006 | Chan et al. ................ 707/201 |
| 2006/0224325 A1 | 10/2006 | Conway et al. .............. 702/19 |
| 2006/0230234 A1 | 10/2006 | Bentolila et al. ............. 711/133 |
| 2006/0235732 A1 | 10/2006 | Miller et al. ................. 705/7 |
| 2006/0253475 A1 | 11/2006 | Stewart et al. ............. 707/100 |
| 2006/0259338 A1 | 11/2006 | Rodrigue et al. ............. 705/7 |
| 2006/0265377 A1* | 11/2006 | Raman et al. ................. 707/9 |

| | | | | |
|---|---|---|---|---|
| 2006/0271583 | A1 | 11/2006 | Hulen et al. | 707/102 |
| 2006/0282819 | A1 | 12/2006 | Graham et al. | 717/113 |
| 2006/0288211 | A1 | 12/2006 | Vargas et al. | 713/170 |
| 2007/0021992 | A1* | 1/2007 | Konakalla | 705/7 |
| 2007/0022026 | A1 | 1/2007 | Davidson et al. | 705/31 |
| 2007/0050237 | A1 | 3/2007 | Tien et al. | 705/11 |
| 2007/0055564 | A1 | 3/2007 | Fourman | 705/11 |
| 2007/0067381 | A1 | 3/2007 | Grant et al. | 709/200 |
| 2007/0112607 | A1 | 5/2007 | Tien et al. | 705/7 |
| 2007/0143161 | A1 | 6/2007 | Tien et al. | 705/7 |
| 2007/0143174 | A1 | 6/2007 | Tien et al. | 705/11 |
| 2007/0143175 | A1 | 6/2007 | Tien et al. | 705/11 |
| 2007/0156680 | A1 | 7/2007 | Tien et al. | 707/6 |
| 2007/0168323 | A1* | 7/2007 | Dickerman et al. | 707/2 |
| 2007/0225986 | A1 | 9/2007 | Bowe et al. | 705/1 |
| 2007/0234198 | A1 | 10/2007 | Tien et al. | 715/512 |
| 2007/0239508 | A1 | 10/2007 | Fazal et al. | 705/8 |
| 2007/0239573 | A1 | 10/2007 | Tien et al. | 705/35 |
| 2007/0239660 | A1 | 10/2007 | Tien et al. | 707/2 |
| 2007/0255681 | A1 | 11/2007 | Tien et al. | 707/2 |
| 2007/0260625 | A1 | 11/2007 | Tien et al. | 707/101 |
| 2007/0265863 | A1 | 11/2007 | Tien et al. | 705/1 |
| 2007/0266042 | A1* | 11/2007 | Hsu et al. | 707/102 |
| 2007/0282673 | A1 | 12/2007 | Nagpal et al. | 705/11 |
| 2008/0005064 | A1 | 1/2008 | Sarukkai | 707/3 |
| 2008/0040309 | A1 | 2/2008 | Aldridge | 707/1 |
| 2008/0059441 | A1* | 3/2008 | Gaug et al. | 707/4 |
| 2008/0086345 | A1 | 4/2008 | Wilson et al. | 705/7 |
| 2008/0086359 | A1 | 4/2008 | Holton et al. | 705/10 |
| 2008/0109270 | A1 | 5/2008 | Shepherd et al. | 705/7 |
| 2008/0115103 | A1 | 5/2008 | Datars et al. | 717/101 |
| 2008/0140623 | A1 | 6/2008 | Tien et al. | 707/3 |
| 2008/0162209 | A1 | 7/2008 | Gu et al. | 705/7 |
| 2008/0162210 | A1 | 7/2008 | Gu et al. | 705/7 |
| 2008/0163066 | A1 | 7/2008 | Gu et al. | 715/738 |
| 2008/0163099 | A1 | 7/2008 | Gu et al. | 715/780 |
| 2008/0163125 | A1 | 7/2008 | Gu et al. | 715/853 |
| 2008/0163164 | A1 | 7/2008 | Chowdhary et al. | 717/106 |
| 2008/0168376 | A1 | 7/2008 | Tien et al. | 715/772 |
| 2008/0172287 | A1 | 7/2008 | Tien et al. | 705/10 |
| 2008/0172348 | A1 | 7/2008 | Tien et al. | 706/12 |
| 2008/0172414 | A1 | 7/2008 | Tien et al. | 707/104.1 |
| 2008/0172629 | A1 | 7/2008 | Tien et al. | 715/771 |
| 2008/0183564 | A1 | 7/2008 | Tien et al. | 705/11 |
| 2008/0184099 | A1 | 7/2008 | Tien et al. | 715/209 |
| 2008/0184130 | A1 | 7/2008 | Tien et al. | 715/745 |
| 2008/0189632 | A1 | 8/2008 | Tien et al. | 715/764 |
| 2008/0189724 | A1 | 8/2008 | Tien et al. | 719/329 |
| 2008/0243597 | A1 | 10/2008 | Ballow et al. | 705/11 |
| 2008/0288889 | A1 | 11/2008 | Hunt et al. | 705/810 |
| 2009/0300110 | A1 | 12/2009 | Chene et al. | 709/203 |
| 2010/0262659 | A1 | 10/2010 | Christiansen et al. | 709/205 |

OTHER PUBLICATIONS

Mulins, Craig S., Distributed Query Optimization Technical Support, Jul. 1996.*

Callen, Daniel J. et al., Consolidation of Query Results in a Multidatabase Environment: An Object Oriented Approach IEEE, 1996.*

Ergometrics.com Web Pages Ergometrics, Feb.-Mar. 2000, Retrieved from Archive.org Jan. 25, 2007.*

Arnold, Tom, Dashboard & Scorecard Software—Tools for Operations Management and Strategy Deployment Sep. 18, 2002.* iDashes.net Web Pages iDahes, Inc., May 2001, Retrieved from Archive.org Jan. 25, 2007.*

SYSPRO Offers Executive Dashboard with SYSPRO e.net Solutions Business Wire, Oct. 11, 2004.*

Park, Joon S. et al., Role-Based Access Control on the Web ACM Transactions on Information and System Security, vol. 4, No. 1, Feb. 2001.*

Microsoft Office Business Scorecard Manager Microsoft, 2003.*

Microsoft Takes Up Scorecarding; Performance Management app aims to maximize Office eWeek, Oct. 31, 2005.*

Tedeschi, Bob, Digital cockpits are a faster, much clser way of tracking performance in a copration's every corner New York Times, Jul. 29, 2002.*

Havenstein, Heather, BI Reporting Tools Improve InfoWorld, vol. 25, No. 45, Nov. 17, 2003.*

Chien et al., XML Document Versioning, SIGMOD Record, vol. 30, No. 3, Sep. 2001.

U.S. Official Action mailed Mar. 17, 2010 in U.S. Appl. No. 11/280,548.

U.S. Official Action mailed Mar. 25, 2010 in U.S. Appl. No. 11/393,115.

U.S. Official Action mailed Mar. 30, 2010 in U.S. Appl. No. 11/313,390.

U.S. Official Action mailed Mar. 31, 2010 in U.S. Appl. No. 11/313,327.

U.S. Official Action mailed Apr. 1, 2010 in U.S. Appl. No. 11/313,899.

U.S. Official Action mailed Apr. 7, 2010 in U.S. Appl. No. 11/412,499.

Cognos Incorporated, "Scorecarding with Cognos Metrics Manager," Oct. 2004.

Charles Bloomfield, "Bringing the Balanced Scorecard to Life: The Microsoft Balanced Scorecard Framework," Microsoft Corporation White Paper, May 2002.

U.S. Official Action mailed Apr. 14, 2010 in U.S. Appl. No. 11/313,324.

U.S. Official Action mailed Apr. 23, 2010 in U.S. Appl. No. 11/214,678.

U.S. Official Action mailed May 12, 2010 in U.S. Appl. No. 11/624,171.

U.S. Official Action mailed May 26, 2010 in U.S. Appl. No. 11/393,335.

U.S. Official Action mailed May 26, 2010 in U.S. Appl. No. 11/668,520.

IBM WebSphere: Chapter 6—Working with WebSphere Business Modeler, cited in U.S. Appl No. 11/313,390 in OA dated Sep. 1, 2010, 20 pgs.

U.S. Official Action mailed Aug. 4, 2010 in U.S. Appl. No. 11/280,548.

U.S. Official Action mailed Aug. 10, 2010 in U.S. Appl. No. 11/623,818.

U.S. Official Action mailed Aug. 30, 2010 in U.S. Appl. No. 11/313,327.

U.S. Official Action mailed Sep. 1, 2010 in U.S. Appl. No. 11/313,390.

U.S. Official Action mailed Sep. 8, 2010 in U.S. Appl. No. 11/670,516.

U.S. Official Action mailed Sep. 9, 2010 in U.S. Appl. No. 11/412,499.

U.S. Official Action mailed Sep. 29, 2010 in U.S. Appl. No. 11/313,324.

U.S. Official Action mailed Oct. 6, 2010 in U.S. Appl. No. 11/313,899.

U.S. Official Action mailed Oct. 12, 2010 in U.S. Appl. No. 11/623,953.

U.S. Official Action mailed Jul. 21, 2010 in U.S. Appl. No. 11/039,714.

Monson et al., "IBM Workplace for Business Controls and Reporting: Administration and Operations Best Practices", IBM Redpaper, Oct. 2005, pp. 1-240.

"Cognos Business Intelligence Series 7, Cognos Impromptu (2006), Mastering Impromptu Reports", Cognos Incorporated, pp. 1-154.

"Cognos Series 7 PowerPlay Transformer", (2003), Installation Guide, Cognos Incorporated, pp. 1-62.

"Cognos Business Intelligence Series Cognos PowerPlay for Windows (2006), Discovering PowerPlay", Cognos Incorporated, pp. 1-74.

"Cognos Business Intelligence Series 7 PowerPlay for Windows", (2006), PowerPlay User Guide, Cognos Incorporated, pp. 1-230.

"Epicor Vantage: Introducing the Next Generation Global Enterprise Resource Planning Software", Epicore Vantage, http://m.scala.com.cn'downloads/vantage/vantage6Oage.pdf, printed Jan. 12, 2006, 60 pgs.

T. E. Graedel et al., "Hierarchical Metrics for Sustainability", Environmental Quality Management, Winter, 2002, vol. 12 Issue 12, pp. 21-30, Retrieved from Business Source Complete Database.

U.S. Official Action mailed Nov. 5, 2010 in U.S. Appl. No. 11/393,335.
U.S. Official Action mailed Nov. 10, 2010 in U.S. Appl. No. 11/624,122.
U.S. Official Action mailed Nov. 10, 2010 in U.S. Appl. No. 11/668,763.
U.S. Official Action mailed Nov. 24, 2010 in U.S. Appl. No. 11/670,444.
U.S. Official Action mailed Nov. 29, 2010 in U.S. Appl. No. 11/668,520.
U.S. Official Action mailed Dec. 8, 2010 in U.S. Appl. No. 11/214,678.
U.S. Official Action mailed January 6, 2011 in U.S. Appl. No. 11/313,324.
U.S. Official Action mailed Jan. 25, 2011 in U.S. Appl. No. 11/280,548.
U.S. Official Action mailed Feb. 1, 2011 in U.S. Appl. No. 11/670,516.
U.S. Official Action mailed Mar. 1, 2011 in U.S. Appl. No. 11/412,499.
U.S. Official Action mailed Mar. 2, 2011 in U.S. Appl. No. 11/624,122.
U.S. Official Action mailed Mar. 4, 2011 in U.S. Appl. No. 11/668,763.
U.S. Official Action mailed Apr. 1, 2011 in U.S. Appl. No. 11/313,899.
U.S. Official Action mailed Apr. 4, 2011 in U.S. Appl. No. 11/624,171.
U.S. Official Action mailed Apr. 12, 2011 in U.S. Appl. No.11/623,953.
U.S. Official Action mailed May 10, 2011 in U.S. Appl. No. 11/393,335.
U.S. Official Action mailed May 18, 2011 in U.S. Appl. No. 11/670,444.
U.S. Official Action mailed May 23, 2011 in U.S. Appl. No. 11/623,818.
U.S. Official Action mailed Jun. 7, 2011 in U.S. Appl. No. 11/670,516.
U.S. Official Action mailed Jun. 13, 2011 in U.S. Appl. No. 11/668,520.
U.S. Official Action mailed Jun. 21, 2011 in U.S. Appl. No. 11/408,450.
U.S. Official Action mailed Jun. 24, 2011 in U.S. Appl. No. 11/280,548.
U.S. Official Action mailed Jul. 6, 2011 in U.S. Appl. No. 11/214,678.
U.S. Official Action mailed Jul. 14, 2011 in U.S. Appl. No. 11/668,763.
MrExcel Consulting, Using Excel to Track Student Grades; Nov. 2006; 6 pgs.
Kraynak,"Absolute Beginner's Guide to Microsoft Excel 2003", Sep. 2003, Appendix A; 4 pgs.
U.S. Official Action mailed Aug. 8, 2011 in U.S. Appl. No. 11/313,324.
U.S. Official Action mailed Oct. 4, 2011 in U.S. Appl No 11/624,171.
U.S. Official Action mailed Oct. 24, 2011 in U.S. Appl. No. 11/393,335.
U.S. Official Action mailed Nov. 8, 2011 in U.S. Appl. No. 11/670,516.
U.S. Official Action mailed Nov. 9, 2011 in U.S. Appl. No. 11/623,818.
U.S. Official Action mailed Nov. 10, 2011 in U.S. Appl. No. 11/627,640.
U.S. Official Action mailed Nov. 28, 2011 in U.S. Appl. No. 11/668,763.
U.S. Official Action mailed Dec. 1, 2011 in U.S. Appl. No. 11/670,444.
U.S. Official Action mailed Dec. 12, 2011 in U.S. Appl. No. 11/313,899.
U.S. Official Action mailed Jan. 4, 2012 in U.S. Appl. No. 11/280,548.

* cited by examiner

CONSOLIDATING DATA SOURCE QUERIES FOR MULTIDIMENSIONAL SCORECARDS

BACKGROUND

Key Performance Indicators, also known as KPI or Key Success Indicators (KSI), help an organization define and measure progress toward organizational goals. Once an organization has analyzed its mission, identified all its stakeholders, and defined its goals, it needs a way to measure progress toward those goals. Key Performance Indicators are used to provide those measurements.

Scorecards are used to provide detailed and summary analysis of KPIs and aggregated KPIs such as KPI groups, objectives, and the like. Scorecard calculations are typically specific to a defined hierarchy of the above mentioned elements, selected targets, and status indicator schemes. Business logic applications that generate, author, and analyze scorecards are typically enterprise applications with multiple users (subscribers), designers, and administrators. It is not uncommon, for organizations to provide their raw performance data to a third party and receive scorecard representations, analysis results, and similar reports.

Scorecards are composed of business metrics from a variety of sources and summarize business performance for decision makers so the performance can be monitored. However, bringing together multiple data sources may introduce scalability problems that limit a frequency of generating reports, a size of the audience they can attend to, and a number of metrics that can be included. A naïve implementation of scorecards can lead to significantly hampered productivity.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to determining data sources associated with elements of a scorecard and dynamically generating queries that optimize data retrieval for the elements that are associated with the same data source(s). According to other embodiments, query optimization may be based on an attribute and/or a condition of a data source, a subscriber identity, and the like. Retrieved data may be cached at element level, at combination of elements level, or at scorecard level for further optimization of scorecard building process.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a scorecard building and/or update process may be enhanced by generating queries that are optimized by combining data retrieval for elements associated with the same data source. The queries may be further optimized based on an attribute and/or a condition of a data source. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
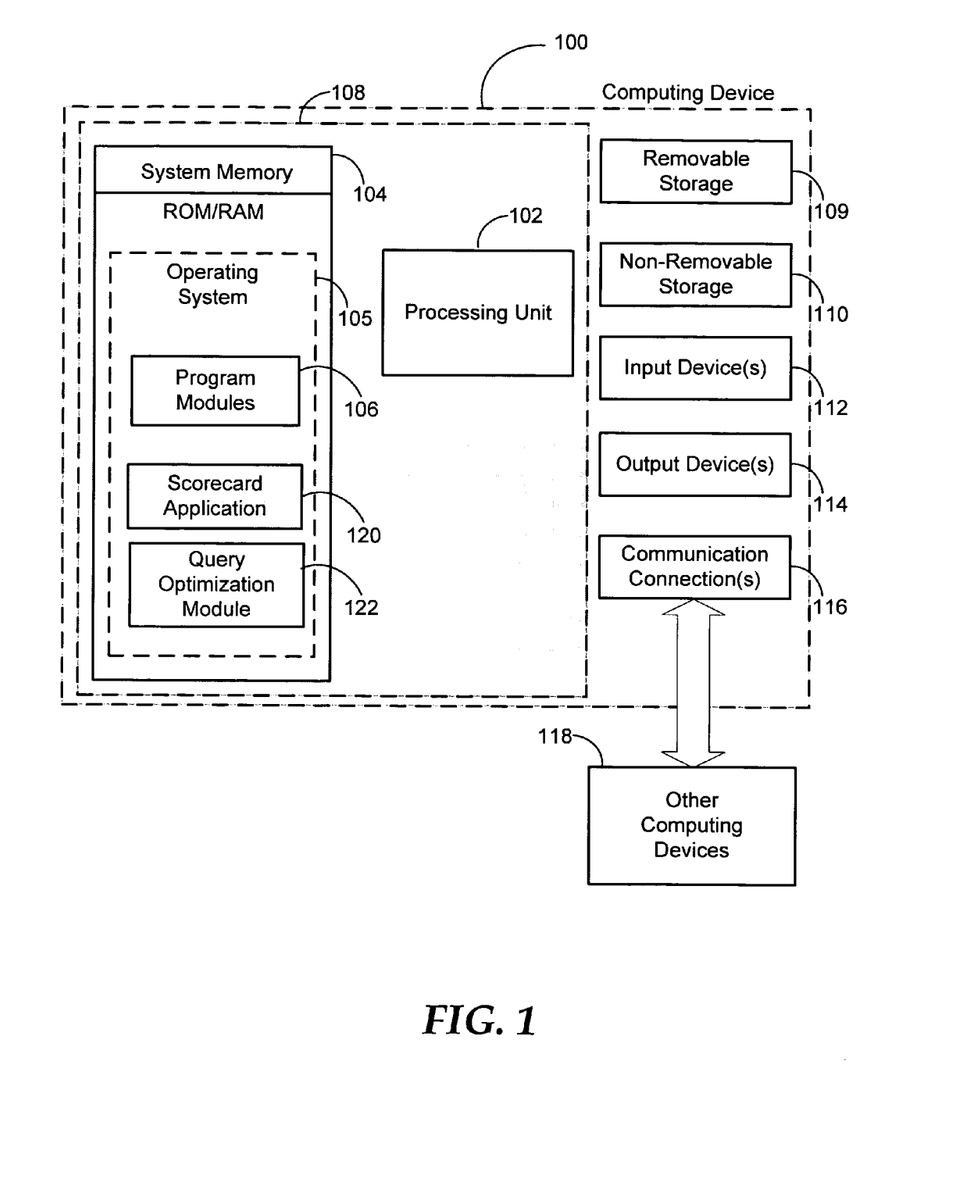
FIG. 1 is a block diagram of an example computing operating environment.

Referring now to the drawings, aspects and an exemplary operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one example system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106, scorecard application 120, and query optimization module 122. Scorecard application 120 manages business evaluation methods, computes KPIs, and provides scorecard data to reporting applications. In some embodiments, scorecard application 120 may itself generate reports based on metric data.

Query optimization module 122 is configured to optimize queries for retrieving data associated with the elements of a scorecard based on the data sources from which the data is retrieved. Query optimization module 122 may reduce a number of total queries based on the data sources shared by some of the elements. The queries may be further adjusted and optimized based on attributes and conditions of the data sources or even identitys of subscribers requesting the scorecard information. Query optimization module 122 may be an integrated part of scorecard application 120 or a separate application. Scorecard application 120 and query optimization module 122 may communicate between themselves and with other applications running on computing device 100 or on other devices. Furthermore, either one of scorecard application 120 and query optimization module 122 may be executed in an operating system other than operating system 105. This basic configuration is illustrated in FIG. 1 by those components within dashed line 108.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
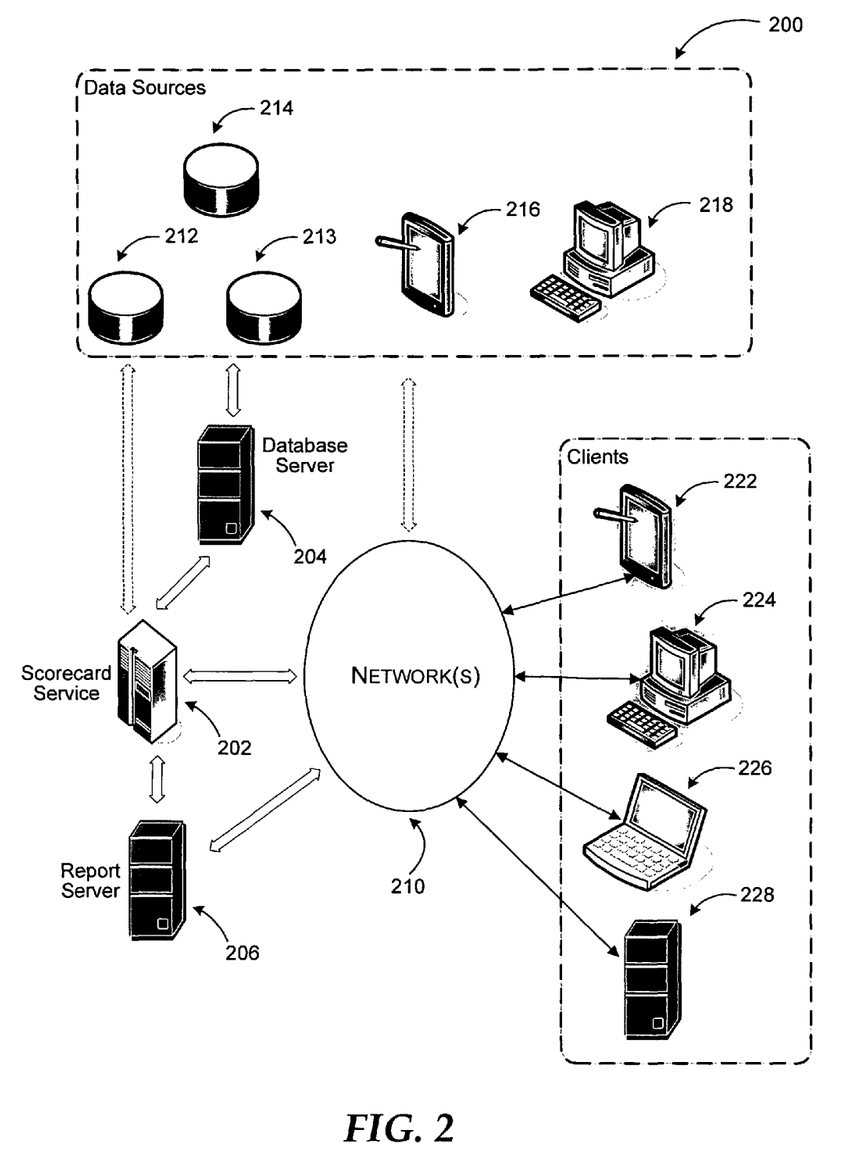
FIG. 2 illustrates a system where example embodiments may be implemented.

Referring to FIG. 2, a system where example embodiments may be implemented, is illustrated. System 200 may comprise any topology of servers, clients, Internet service providers, and communication media. Also, system 200 may have a static or dynamic topology. The term "client" may refer to a client application or a client device employed by a user to perform business logic operations. Scorecard service 202, database server 204, and report server 206 may also be one or more programs or a server machine executing programs associated with the server tasks. Both clients and application servers may be embodied as single device (or program) or a number of devices (programs). Similarly, data sources may include one or more data stores, input devices, and the like.

A business logic application may be run centrally on scorecard service 202 or in a distributed manner over several servers and/or client devices. Scorecard service 202 may include implementation of a number of information systems such as performance measures, business scorecards, and exception reporting. A number of organization-specific applications including, but not limited to, financial reporting, analysis, marketing analysis, customer service, and manufacturing planning applications may also be configured, deployed, and shared in system 200. In addition, the business logic application may also be run in one or more client devices and information exchanged over network(s) 210.

Data sources 212-214, 216, and 218 are examples of a number of data sources that may provide input to scorecard service 202 directly or through database server 204. Additional data sources may include SQL servers, databases, non multi-dimensional data sources such as text files or EXCEL® sheets, multi-dimensional data source such as data cubes, and the like. Database server 204 may manage the data sources, optimize queries, and the like. Elements of a scorecard built and maintained by scorecard service 202 may be associated with one or more of the data sources.

Users may interact with scorecard service 202 running the business logic application from client devices 222, 224, and 226 over network(s) 210. In one embodiment, additional applications that consume scorecard-based data may reside on scorecard service 202 or client devices 222, 224, and 226. Examples of such applications and their relation to the scorecard application are provided below in conjunction with FIG. 3.

Report server 206 may include reporting applications, such as charting applications, alerting applications, analysis applications, and the like. These applications may receive scorecard data from scorecard service 202 and provide reports directly or through scorecard service 202 to clients.

Network(s) 210 may include a secure network such as an enterprise network, or an unsecure network such as a wireless open network. Network(s) 210 provide communication between the nodes described above. By way of example, and not limitation, network(s) 210 may include wired media such as a wired network or direct-wired connection, and wireless media such as acoustic, RF, infrared and other wireless media.

Many other configurations of computing devices, applications, data sources, data distribution and analysis systems may be employed to implement a business logic application automatically generating dashboards with scorecard metrics and subordinate reporting.

Figure 3:
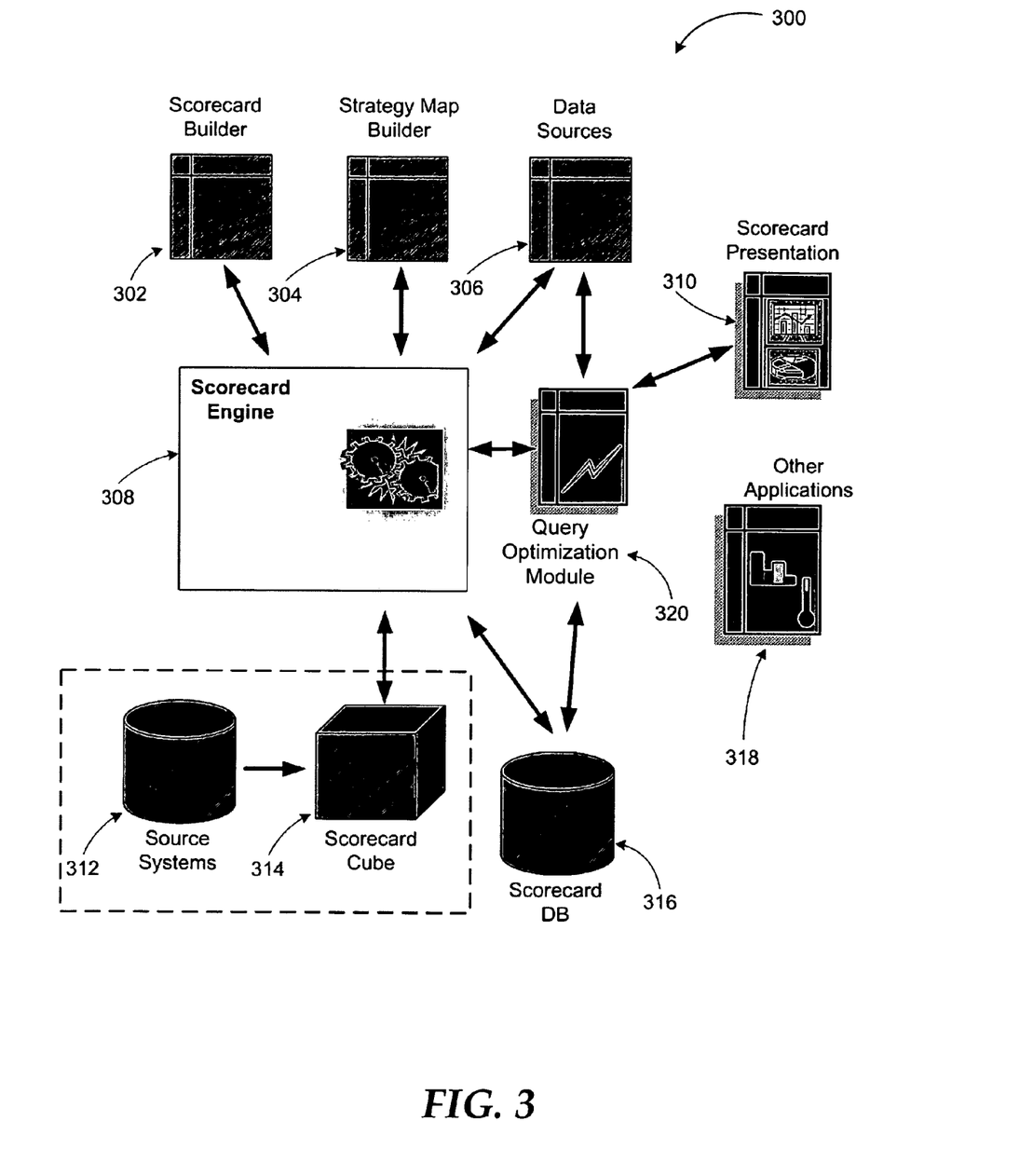
FIG. 3 illustrates an example scorecard architecture according to embodiments.

Now referring to FIG. 3, example scorecard architecture 300 is illustrated. Scorecard architecture 300 may comprise any topology of processing systems, storage systems, source systems, and configuration systems. Scorecard architecture 300 may also have a static or dynamic topology.

Scorecards are a simple method of evaluating organizational performance. The performance measures may vary from financial data such as sales growth to service information such as customer complaints. In a non-business environment, student performances and teacher assessments may be another example of performance measures that can employ scorecards for evaluating organizational performance. In the exemplary scorecard architecture 300, a core of the system is scorecard engine 308. Scorecard engine 308 may be an application that is arranged to evaluate performance metrics. Scorecard engine 308 may be loaded into a server, executed over a distributed network, executed in a client device, and the like.

In addition to performing scorecard calculation, scorecard engine may also provide report parameters associated with a scorecard to other applications 318. The report parameters may be determined based on a subscriber request or a user interface configuration. The user interface configuration may include a subscriber identity or a subscriber permission attribute. The report parameter may include a scorecard identifier, a scorecard view identifier, a tow identifier, a column identifier, a page filter, a performance measure group identifier, or a performance measure identifier. The performance measure may be a KPI, a KPI group, or an objective. The page filter determines a period and an organizational unit for application of the scorecard calculations.

Data for evaluating various measures may be provided by a data source. The data source may include source systems 312, which provide data to a scorecard cube 314. Source systems 312 may include multi-dimensional databases such as an Online Analytical Processing (OLAP) database, other databases, individual files, and the like, that provide raw data for generation of scorecards. Scorecard cube 314 is a multi-dimensional database for storing data to be used in determining Key Performance Indicators (KPIs) as well as generated scorecards themselves. As discussed above, the multi-dimensional nature of scorecard cube 314 enables storage, use, and presentation of data over multiple dimensions such as compound performance indicators for different geographic areas, organizational groups, or even for different time intervals. Scorecard cube 314 has a bi-directional interaction with scorecard engine 308 providing and receiving raw data as well as generated scorecards.

Scorecard database 316 is arranged to operate in a similar manner to scorecard cube 314. In one embodiment, scorecard database 316 may be an external database providing redundant back-up database service. Data from scorecard cube 314, scorecard database 316, or other data sources may be provided to individual elements of a scorecard such as actuals, targets, and the like associated with individual metrics (KPI's, Objectives, and the like).

Scorecard builder 302 may be a separate application, a part of the performance evaluation application, and the like. Scorecard builder 302 is employed to configure various parameters of scorecard engine 308 such as scorecard elements, default values for actuals, targets, and the like. Scorecard builder 302 may include a user interface such as a web service, a Graphical User Interface (GUI), and the like.

Strategy map builder 304 is employed to a later stage in scorecard generation process. As explained below, scores for KPIs and parent nodes such as Objective and Perspective may be presented to a user in form of a strategy map. Strategy map builder 304 may include a user interface for selecting graphical formats, indicator elements, and other graphical parameters of the presentation.

Data Sources 306 may be another source for providing raw data to scorecard engine 308. Data sources may be comprised of a mix of several multi-dimensional and relational databases or other Open Database Connectivity (ODBC)-accessible data source systems (e.g. Excel, text files, etc.). Data sources 306 may also define KPI mappings and other associated data.

Scorecard architecture 300 may include scorecard presentation 310. This may be an application to deploy scorecards, customize views, coordinate distribution of scorecard data, and process web-specific applications associated with the performance evaluation process. For example, scorecard presentation 310 may include a web-based printing system, an email distribution system, and the like. A user interface for scorecard presentation 310 may also include an overview of available scorecards for a subscriber to select from. Scorecard presentation 310 may further include a matrix or a list presentation of the scorecard data. The scorecard presentation and one or more zones for other applications may be displayed in an integrated manner.

Query optimization module 320 is arranged to reduce a total number of queries and further optimize the queries for overall enhancement of the scorecard building and maintenance process. Query optimization module 320 may also be involved in caching of a portion or all of the data for a particular scorecard. Data retrieved from remote data sources may be cached for rapid and efficient building and updating of scorecards. The data may be cached as a single block for the entire scorecard, for individual elements, or for combinations of selected elements. This way, multiple scorecards may be built using the same cached data with increased efficiency.

Other applications 318 may include any application that receives data associated with a report parameter and consumes the data to provide a report, perform analysis, provide alerts, perform further calculations, and the like. The data associated with the report parameter includes content data and metadata. Other applications may be selected based on the report parameter, a subscriber request, or a user interface configuration. The user interface configuration may include a subscriber identity or a subscriber permission attribute. Other applications 318 may include a graphical representation application, a database application, a data analysis application, a communications application, an alerting application, or a word processing application.

Figure 4:
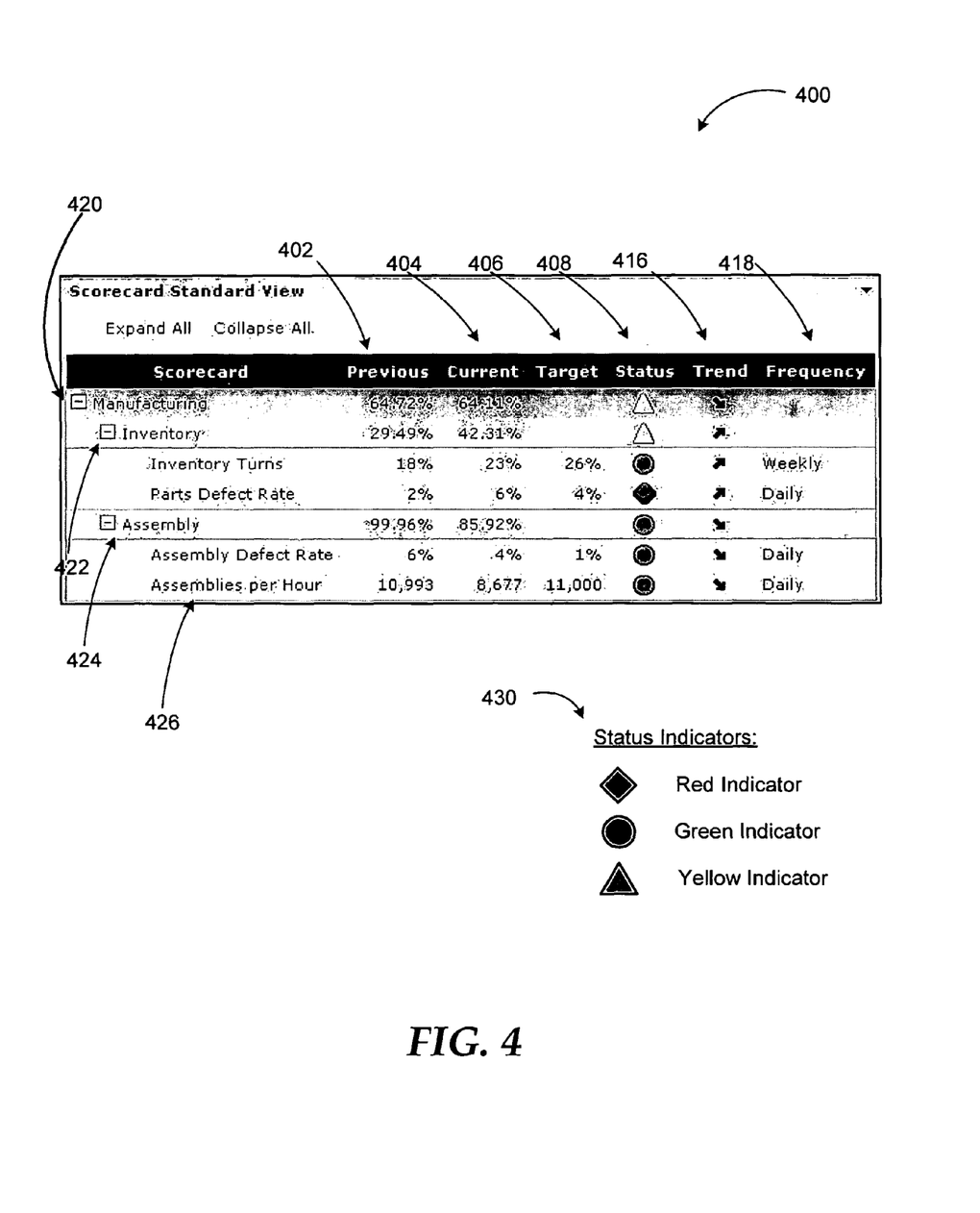
FIG. 4 illustrates a screenshot of an example scorecard.

FIG. 4 illustrates a screenshot of an example scorecard. As explained before, Key Performance Indicators (KPIs) are specific indicators of organizational performance that measure a current state in relation to meeting the targeted objectives. Decision makers may utilize these indicators to manage the organization more effectively.

When creating a KPI, the KPI definition may be used across several scorecards. This is useful when different scorecard managers might have a shared KPI in common. The shared use of KPI definition may ensure a standard definition is used for that KPI. Despite the shared definition, each individual scorecard may utilize a different data source and data mappings for the actual KPI.

Each KPI may include a number of attributes. Some of these attributes include frequency of data, unit of measure, trend type, weight, and other attributes. The frequency of data identifies how often the data is updated in the source database (cube). The frequency of data may include: Daily, Weekly, Monthly, Quarterly, and Annually.

The unit of measure provides an interpretation for the KPI. Some of the units of measure are: Integer, Decimal, Percent, Days, and Currency. These examples are not exhaustive, and other elements may be added without departing from the scope of the invention.

A trend type may be set according to whether an increasing trend is desirable or not. For example, increasing profit is a desirable trend, while increasing defect rates is not. The trend type may be used in determining the KPI status to display and in setting and interpreting the KPI banding boundary values. The trend arrows displayed in scorecard 400 indicate how the numbers are moving this period compared to last. If in this period the number is greater than last period, the trend is up regardless of the trend type. Possible trend types may include: Increasing Is Better, Decreasing Is Better, and On-Target Is Better.

Weight is a positive integer used to qualify the relative value of a KPI in relation to other KPIs. It is used to calculate the aggregated scorecard value. For example, if an Objective in a scorecard has two KPIs, the first KPI has a weight of 1, and the second has a weight of 3 the second KPI is essentially three times more important than the first, and this weighted relationship is part of the calculation when the KPIs' values are rolled up to derive the values of their parent Objective.

Other attributes may contain pointers to custom attributes that may be created for documentation purposes or used for various other aspects of the scorecard system such as creating different views in different graphical representations of the finished scorecard. Custom attributes may be created for any scorecard element and may be extended or customized by application developers or users for use in their own applications. They may be any of a number of types including text, numbers, percentages, dates, and hyperlinks.

One of the benefits of defining a scorecard is the ability to easily quantify and visualize performance in meeting organizational strategy. By providing a status at an overall scorecard level, and for each perspective, each objective or each KPI rollup, one may quickly identify where one might be off target. By utilizing the hierarchical scorecard definition along with KPI weightings, a status value is calculated at each level of the scorecard.

First column of scorecard 400 shows example elements perspective 420 "Manufacturing" with objectives 422 and 424 "Inventory" and "Assembly" (respectively) reporting to it. Second column 402 in scorecard 400 shows results for each measure from a previous measurement period. Third column 404 shows results for the same measures for the current measurement period. In one embodiment, the measurement period may include a month, a quarter, a tax year, a calendar year, and the like.

Fourth column 406 includes target values for specified KPIs on scorecard 400. Target values may be retrieved from a database, entered by a user, and the like. Column 408 of scorecard 400 shows status indicators.

Status indicators 430 convey the state of the KPI. An indicator may have a predetermined number of levels. A traffic light is one of the most commonly used indicators. It represents a KPI with three-levels of results—Good, Neutral, and Bad. Traffic light indicators may be colored red, yellow, or green. In addition, each colored indicator may have its own unique shape. A KPI may have one stoplight indicator visible at any given time. Indicators with more than three levels may appear as a bar divided into sections, or bands. Column 416 includes trend type arrows as explained above under KPI attributes. Column 418 shows another KPI attribute, frequency.

Figure 5:
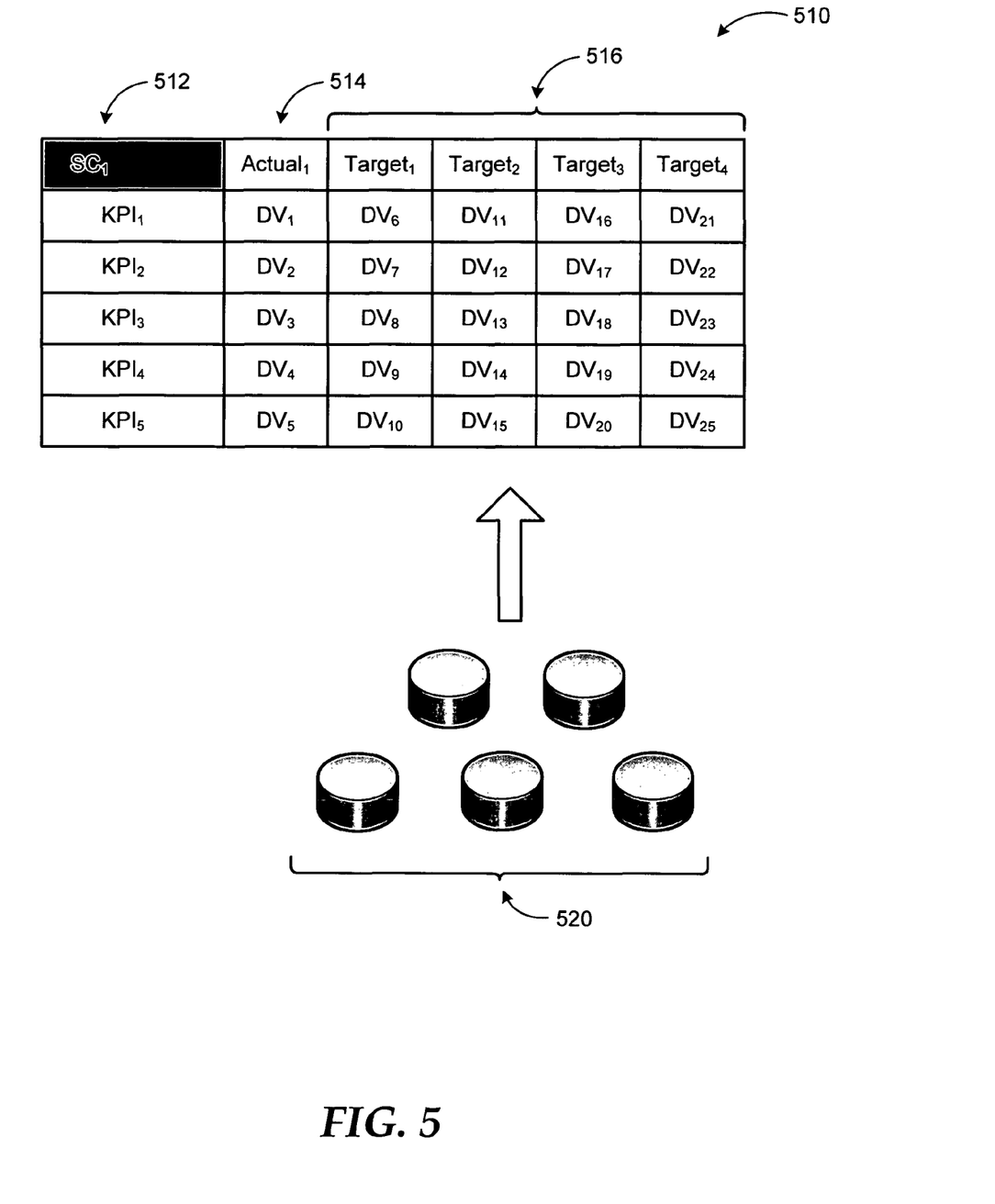
FIG. 5 illustrates a conceptual diagram of an example scorecard and its elements' association with multiple data sources according to embodiments.

FIG. 5 illustrates a conceptual diagram of an example scorecard and its elements' association with multiple data sources according to embodiments. The diagram includes example scorecard 510 with hierarchically structured KPIs (512) and a set of actuals (514) and four example sets of targets (516) for each KPI. The diagram also includes representative data sources 520.

Scorecards can be composed of multiple metrics ($KPI_1$-$KPI_5$) from different data sources (520). Each metric may be composed of an actual (data values $DV_1$-$DV_5$) and up to N targets (data values $DV_6$-$DV_{25}$). Each target may be associated with up to two data sources depending on what the actual is to be compared against (e.g. displaying a comparison against one data value and calculating banding logic based on another). According to one scenario, one might compare the actual number of product defects to the number of product defects in the previous week, but determine a green, yellow, or red status based on the percentage of products with defects comparing this week from last.

An upper boundary for a query that needs to take place for each scorecard is: (1*Actual+(Number of Targets*2))*Number of elements. According to some embodiments, a list of elements (KPIs) in a scorecard is scanned at runtime and those associated with the same data sources are determined. The total number of queries is then optimized by rewriting the appropriate queries.

According to other embodiments, the queries may be further optimized based on an attribute or condition of a data source. For example, time-outs and other query parameters may be adjusted depending on an accessibility or retrieval speed associated with a data source. Even a time of execution for the queries may be set based on the data source(s). In another example, a scorecard may include data from a number of data sources in different countries. To accommodate server and communication channel capacity, the queries for some of those data sources may be scheduled to be executed in off-peak times.

Page filters for scorecards that define time, product, geography, and similar filtering of scorecard views may also be considered in rewriting the queries. In one embodiment, the queries, both multidimensional and relational, may be rewritten (and combined) based on multiple scorecards, such that data for elements of different scorecards that are associated with the same data source can be retrieved in a single process. In another embodiment, the query rewriting process may take into account a subscriber's identitys and/or permissions since those may affect access to data sources.

Frequency of update may be different for data associated with various elements. Hence, not all data has to be retrieved at the same interval. Accordingly, some or all of the retrieved data may be cached for the whole scorecard, for a combination of elements, or even for individual elements. When a scorecard is to be built or updated, cached data may be used reducing the retrieval process to only the portion of the data that needs to be updated based on its renewal frequency.

According to yet other embodiments, appropriate new timeouts may be set for combined queries to reflect the modified data retrieval or timeouts of individual queries adjusted to reflect attributes and/or conditions of data sources. For example, a timeout value for a query that is used to retrieve data for $KPI_2$ may be set at 15 seconds. If $KPI_1$, $KPI_2$, and $KPI_3$ share the same data source, the new query would retrieve data for all three KPIs. Hence, the timeout for the new query may be slightly increased to accommodate the increased data retrieval for that particular query.

The scorecards, metrics, and data sources discussed in FIGS. 2-5 are for illustration purposes only. Embodiments are not limited to the example scorecards, metrics, systems, and data retrieval methods for optimizing a scorecard building and maintenance process. Concerted coordination of multiple scorecards may be provided in many other ways using the principles described herein.

Figure 6:
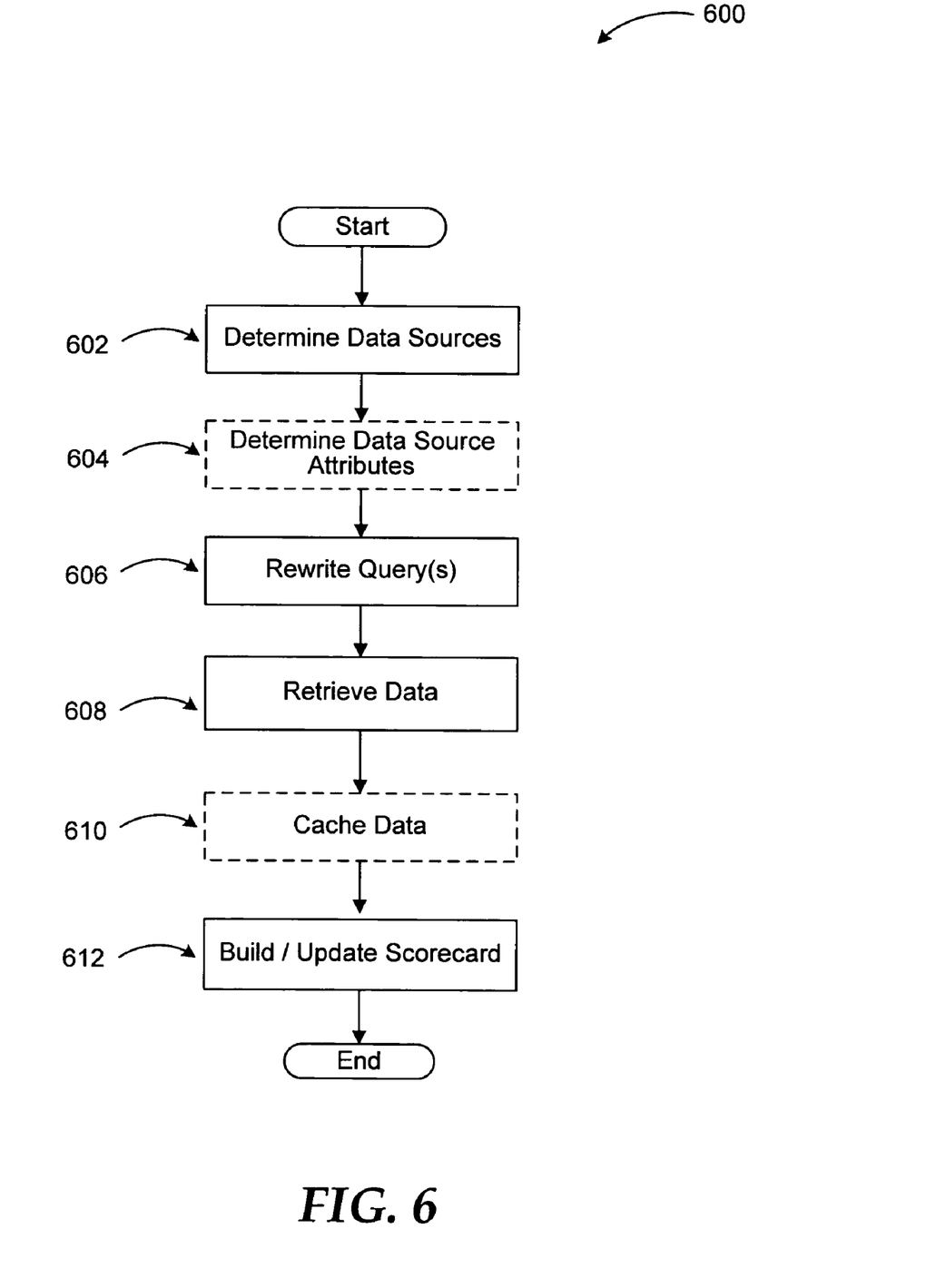
FIG. 6 illustrates a logic flow diagram for a process of optimizing scorecard building by optimizing queries.

FIG. 6 illustrates a logic flow diagram for a process of optimizing scorecard building by optimizing queries. Process 600 may be implemented in a business logic application such as a scorecard application as described in FIGS. 1 and 2.

Process 600 begins with operation 602, where data sources associated with individual metrics (e.g. KPIs, Objectives, and the like) are determined. As mentioned previously, each metric may be associated with one or more data source that may be virtually or physically separated. Processing advances from operation 602 to optional operation 604.

At optional operation 604, an attribute or a condition of the data sources associated with the metrics of the scorecard(s) is determined. Access parameters for each data source may be different. Furthermore, a condition of each data source such as physical location, access time, communication channel quality, and the like, is also likely to vary among the data sources associated with the scorecard(s). Processing moves from optional operation 604 to operation 606.

At operation 606, one or more queries are dynamically rewritten. Rewriting the queries may involve combining multiple queries associated with the same data source into a single query, optimizing the queries based on access conditions of each data source, user identitys, and the like. The queries may be further optimized by adjusting timeouts and other query parameters. The new queries may be associated with a group of scorecard elements or with a group of scorecards. Processing proceeds from operation 606 to operation 608.

At operation 608, the data is retrieved from the data sources based on the rewritten queries. As mentioned previously, new timeouts may be defined for the retrieval of data based on a scope of the new queries and/or data source conditions. Moreover, the data may be retrieved such that the result set is optimized for a scorecard matrix. Processing moves from operation 608 to optional operation 610.

At optional operation 610, retrieved data may be cached for subsequent use in building or maintaining one or more scorecards. Some data may be updated more frequently than other data. In such cases, the less frequently updated data may be cached at element, group of elements, or scorecard levels. Caching can also occur at the data source level. For example, a target called "monthly forecast" may be associated with five KPIs that draw their values from the same data source. That data source may be cached and the results for that particular target may be returned without a query, while other values in the scorecard may require additional queries. The cached data can be used in building or updating one or more scorecards without a need to retrieve the same data repeatedly saving system resources. Processing advances from optional operation 610 to operation 612.

At operation 612, a scorecard is built or updated using the retrieved (or cached) data according to the predefined metric hierarchy. Other operations may follow operation 612 such as generating or presenting reports, issuing alerts, providing notifications, and the like. After operation 612, processing moves to a calling process for further actions.

The operations included in process 600 are for illustration purposes. Optimizing data retrieval in a scorecard application by rewriting queries may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for optimizing data retrieval in a scorecard service, the method comprising:
   determining a first data source and a second data source associated with a first scorecard element and a second scorecard element, respectively, the first scorecard element and the second scorecard element being part of a scorecard comprising scorecard elements associated with multiple data sources;
   receiving a first query for the first scorecard element associated with the first data source;
   receiving a second query for the second scorecard element associated with the second data source;
   determining whether the first data source and the second data source are the same;
   dynamically generating, by a computer, a combined query to retrieve data associated with the first scorecard element and the second scorecard element, when the first data source and the second data source are the same, wherein dynamically generating the combined query comprises rewriting the first query and the second query into the combined query comprising:
   a) determining the identity associated with the subscriber requesting one of the first scorecard element and the second scorecard element;
   b) employing attributes associated with the identity of the subscriber associated with the combined query and a corresponding permission attribute associated with the subscriber;
   c) determining a condition associated with one of the first data source and the second data source, the condition comprising one of: a measure of data transfer reliability, a time of day, a geographic location of the data source, and a data transfer capacity;
   d) optimizing the combined query based on the determined condition;
   retrieving results associated with the first scorecard element and the second scorecard element by executing the dynamically generated combined query; and
   providing an optimized result set for a scorecard matrix comprising the first scorecard element and the second scorecard element based on the retrieved results of the combined query.

2. The method of claim 1, further comprising:
   determining an attribute associated with one of the first data source and the second data source; and
   optimizing the combined query based on the determined attribute.

3. The method of claim 2, wherein determining the attribute associated with one of the first data source and the second data source comprises determining the attribute comprising one of: a data source type and a security protocol associated with the data source.

4. The method of claim 1, further comprising:
   adjusting at least one timeout associated with the generated query based on at least one of the following: an attribute and a condition of the first data source and the second data source.

5. The method of claim 1, further comprising:
assigning at least one timeout associated with the generated query based on at least one of an attribute and a condition of the first data source and the second data source.

6. The method of claim 1, further comprising:
caching the retrieved data at one of: an element level, a combination of elements level, a data source level, and a scorecard level.

7. The method of claim 6, wherein caching the retrieved data comprises caching the retrieved data to update an existing scorecard.

8. The method of claim 1, wherein dynamically generating the query further comprises generating the combined query to provide an optimized result set for a scorecard matrix based on an attribute associated with one of the first data source and the second data source.

9. The method of claim 1, wherein dynamically generating the combined query comprises adjusting the query based on at least one page filter parameter associated with a scorecard that includes the first scorecard element and the second scorecard element.

10. The method of claim 1, further comprising:
generating the query to accommodate a third scorecard element that is associated with the first data source and the second data source.

11. A computer-readable medium having a set of instructions which when executed performs a method for optimizing data retrieval in a scorecard service, the method executed by the set of instructions comprising:
determining a first data source and a second data source associated with a first scorecard element and a second scorecard element, respectively, the first scorecard element and the second scorecard element being part of a scorecard comprising scorecard elements associated with multiple data sources;
receiving a first query for the first scorecard element associated with the first data source;
receiving a second query for the second scorecard element associated with the second data source;
determining whether the first data source and the second data source are the same;
dynamically generating, by a computer, a third query to retrieve data associated with the first scorecard element and the second scorecard element, wherein dynamically generating the third query comprises rewriting the first query and the second query into a combined query comprising:
  a) optimizing the query based on an identity associated with a subscriber requesting one of the first scorecard element and the second scorecard element and a corresponding permission attribute associated with the subscriber;
  b) determining a condition associated with one of the first data source and the second data source, the condition comprising one of: a measure of data transfer reliability, a time of day, a geographic location of the data source, and a data transfer capacity;
  c) optimizing the third query based on the determined condition; comprising:
retrieving results associated with the first scorecard element and the second scorecard element by executing the third combined query; and
providing an optimized result set for a scorecard matrix comprising the first scorecard element and the second scorecard element based on the retrieved results of the third query.

12. The computer-readable medium of claim 11, further comprising dynamically adjusting at least one of a timeout and an execution time for the query based on the condition of each data source.

13. A system for optimizing data retrieval in a scorecard service, the system comprising:
a memory storage; and
a processing unit coupled to the memory storage, wherein the processing unit is configured to:
determining a first data source and a second data source associated with a first scorecard element and a second scorecard element, respectively, the first scorecard element and the second scorecard element being part of a scorecard comprising scorecard elements associated with multiple data sources;
receive, from a subscriber, a first query for the first scorecard element associated with a first scorecard element tied to a first data source,
receive, from the subscriber, a second query for the second scorecard element associated with a second element tied to a second data source,
determine that the first data source and the second data source are the same data source,
determine an identity of the subscriber requesting one of the first scorecard element and the second scorecard element,
determine a permission attribute corresponding to the subscriber, wherein the permission attribute is employed to determine that the subscriber is permitted access to the requested data associated with the first element and the second element,
generate a combined query dynamically to retrieve data associated with the first scorecard element and the second scorecard element, when the first data source and the second data source are the same, based on: the first query, the second query, and the permission attribute corresponding to the subscriber,
the generate a combined query dynamically comprises rewriting the first query and the second query comprising:
  a) determine a condition associated with one of the first data source and the second data source, the condition comprising one of: a measure of data transfer reliability, a time of day, a geographic location of the data source, and a data transfer capacity,
  b) optimize the query based on the determine condition,
retrieve results associated with the first element and the second element by executing the query; and
provide an optimized result set for a scorecard matrix comprising the first element and the second element based on the retrieved results of the query.

14. The system of claim 13, wherein the processing unit is further operative to generate the query based on the attribute and the condition of the data source.

15. The system of claim 13, wherein information about an association of each scorecard metric with a corresponding data source is included in metadata associated with the scorecard metric.

* * * * *